United States Patent
Chavez, Jr.

(10) Patent No.: US 9,873,525 B2
(45) Date of Patent: *Jan. 23, 2018

(54) AIRCRAFT RETRIEVAL DEVICE

(71) Applicant: Jose Cruz Chavez, Jr., Brandon, FL (US)

(72) Inventor: Jose Cruz Chavez, Jr., Brandon, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/416,245

(22) Filed: Jan. 26, 2017

(65) Prior Publication Data
US 2017/0129624 A1    May 11, 2017

Related U.S. Application Data

(63) Continuation of application No. 14/028,029, filed on Sep. 16, 2013.

(51) Int. Cl.
*B64F 1/02* (2006.01)
*B64C 39/02* (2006.01)

(52) U.S. Cl.
CPC .............. *B64F 1/02* (2013.01); *B64C 39/024* (2013.01); *B64C 2201/021* (2013.01); *B64C 2201/182* (2013.01)

(58) Field of Classification Search
CPC .. B64C 39/024; B64F 1/04; B64F 1/02; B64F 1/10
USPC .............................................. 244/110, 110 C
See application file for complete search history.

(56) References Cited

U.S. PATENT DOCUMENTS

| | | | | |
|---|---|---|---|---|
| 3,738,599 A * | 6/1973 | Borehag | ................... | B64F 1/02 244/110 C |
| 4,147,317 A * | 4/1979 | Mayhew | ................ | B64C 39/024 244/110 C |
| 4,979,701 A * | 12/1990 | Colarik | ..................... | B64F 1/02 114/145 R |
| 5,170,966 A * | 12/1992 | Sheu | ........................ | B64F 1/02 244/110 E |
| 5,340,057 A * | 8/1994 | Schmittle | ................ | B64C 3/385 244/39 |
| 5,908,279 A * | 6/1999 | Mote | ........................ | B60P 3/224 414/542 |
| 6,394,391 B1 * | 5/2002 | Lo | ............................. | B64F 1/10 244/110 A |
| 7,210,873 B2 * | 5/2007 | Gelfand | .................. | E01F 13/12 404/6 |
| 7,611,094 B2 * | 11/2009 | Rom | ...................... | B64C 39/024 244/110 C |
| 7,798,445 B2 * | 9/2010 | Heppe | ....................... | B64F 1/02 244/100 A |
| 8,038,097 B1 * | 10/2011 | Monson | .................... | B64F 1/02 244/110 E |

(Continued)

*Primary Examiner* — Tien Q Dinh
*Assistant Examiner* — Michael H Wang
(74) *Attorney, Agent, or Firm* — Dunlap Bennett & Ludwig PLLC

(57) ABSTRACT

A method for retrieving an unmanned aircraft is provided. The retrieval device may include a frame that supports a flexible material. The flexible material may form a receptacle portion shaped to receive the unmanned aircraft. The flexible material may absorb at least a portion of the energy exerted by the aircraft landing within the receptacle portion. Wheels may be connected to the frame to further control and absorb energy from the landing.

10 Claims, 5 Drawing Sheets

(56) References Cited

U.S. PATENT DOCUMENTS

| | | | | |
|---|---|---|---|---|
| 8,056,855 B2* | 11/2011 | Konstantinovskiy | ... | F41H 11/04 114/240 E |
| 8,439,301 B1* | 5/2013 | Lussier | ...... | B64F 1/02 244/63 |
| 8,464,981 B2* | 6/2013 | Goldie | ...... | B64C 39/024 244/110 C |
| 8,475,077 B2* | 7/2013 | Howell | ...... | E01F 15/148 188/371 |
| 9,527,604 B2* | 12/2016 | Melish | ...... | B64F 1/02 |
| 9,669,947 B2* | 6/2017 | Zwaan | ...... | B64F 1/02 |
| 2005/0017129 A1* | 1/2005 | McDonnell | ...... | B64C 25/68 244/110 G |
| 2008/0191091 A1* | 8/2008 | Hoisington | ...... | B64C 39/024 244/110 F |
| 2010/0019085 A1* | 1/2010 | Turrillas Las Heras | .. | B64F 1/02 244/110 C |
| 2011/0303789 A1* | 12/2011 | Miller | ...... | B64F 1/02 244/110 C |
| 2012/0032025 A1* | 2/2012 | Allen | ...... | B64F 1/02 244/110 C |
| 2013/0001366 A1* | 1/2013 | Wolff | ...... | B64F 1/02 244/183 |
| 2014/0061377 A1* | 3/2014 | Smith | ...... | B64C 3/10 244/63 |

\* cited by examiner

AIRCRAFT RETRIEVAL DEVICE

CROSS-REFERENCE TO RELATED APPLICATION

This application is a continuation application of U.S. non-provisional application Ser. No. 14/028,029, filed Sep. 16, 2013, the contents of which are herein incorporated by reference.

BACKGROUND OF THE INVENTION

The present invention relates to an aircraft retrieval device and, more particularly, to an aircraft retrieval device that captures unmanned aerial vehicles.

An unmanned aerial vehicle (UAV), colloquially known as a drone, is an aircraft without a human pilot on board. Its flight is controlled either autonomously by computers in the vehicle or under the remote control of a pilot on the ground or in another vehicle. Most unmanned aircraft need a runway and landing gear to land. Some unmanned aerial vehicles are stopped by flying the aircraft into a stationary rope or net. However, such capture devices may be stressful for the aircraft and therefore may damage the aircraft.

As can be seen, there is a need for a retrieval device that absorbs the energy of an aircraft landing.

SUMMARY OF THE INVENTION

In one aspect of the present invention, a method of retrieving an unmanned aerial vehicle comprises: providing a retrieval device comprising: a frame; a flexible material secured to the frame and forming a receptacle; and a plurality of wheels attached to the frame; flying an unmanned aerial vehicle into the receptacle, wherein the flexible material receives the unmanned aerial vehicle during a landing of the unmanned aerial vehicle, and the plurality of wheels roll from an energy of the landing.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a retrieval device for an unmanned aircraft. The retrieval device may include a frame that supports a flexible material. The flexible material may form a receptacle portion shaped to receive the unmanned aircraft. The flexible material may absorb at least a portion of the energy exerted by the aircraft landing within the receptacle portion. Wheels may be connected to the frame to further control and absorb energy from the landing.

The present invention may include a recovery device for an unmanned aircraft or radio controlled aircraft. The present invention may eliminate the need for a runway or landing gear, while preventing any damage to the aircraft. This may further provide more areas in which the aircraft may land. The aircraft operator may fly the aircraft into the present invention, which may absorb the majority of the momentum and stop the aircraft, without adding additional stress to the aircrafts frame.

The present invention may absorb the aircrafts momentum by rolling forward with the aircraft, either from the impact of the aircraft or by motorized wheels to decrease the capture speed. In certain embodiments, the present invention may utilize a plurality of bungees that may further absorb the aircraft. The present invention may be easily assembled and disassembled, and may be easier to transport than other devices used to capture unmanned aircraft.

Figure 1:
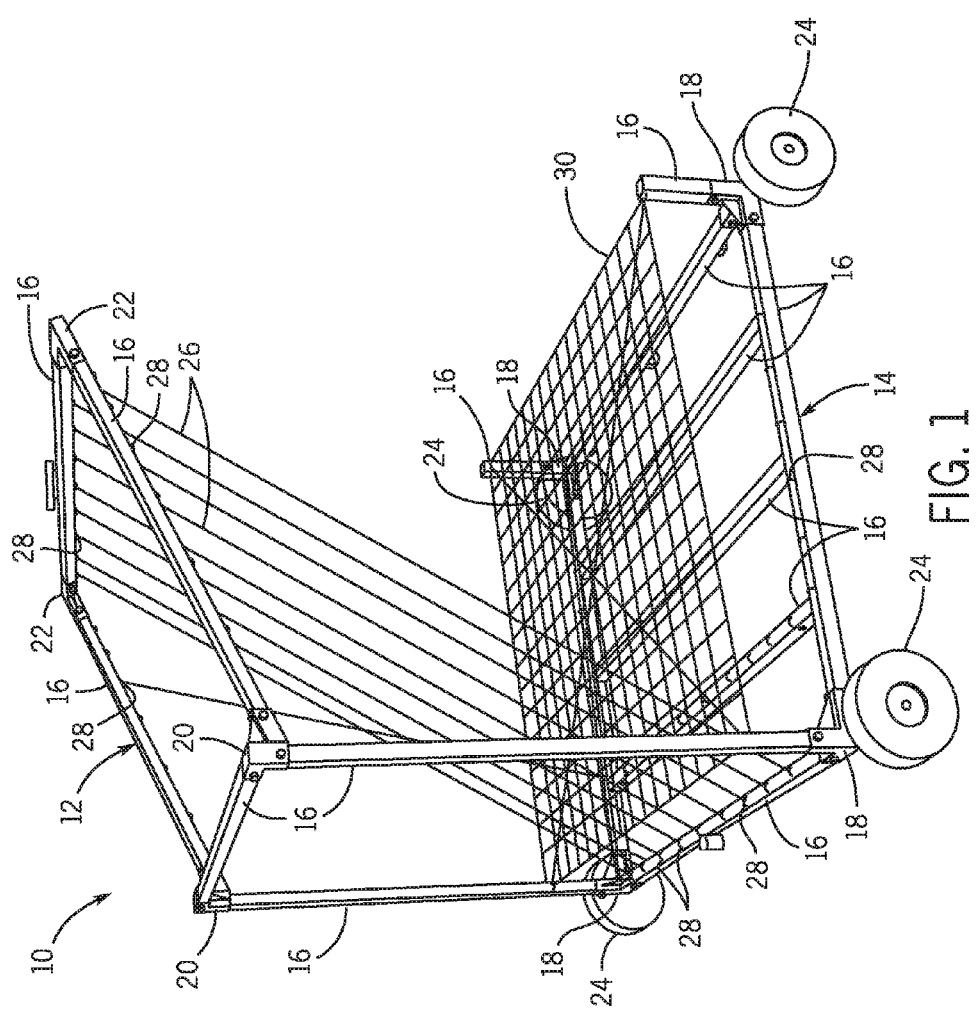
FIG. 1 is a rear perspective view of the present invention.
Figure 2:
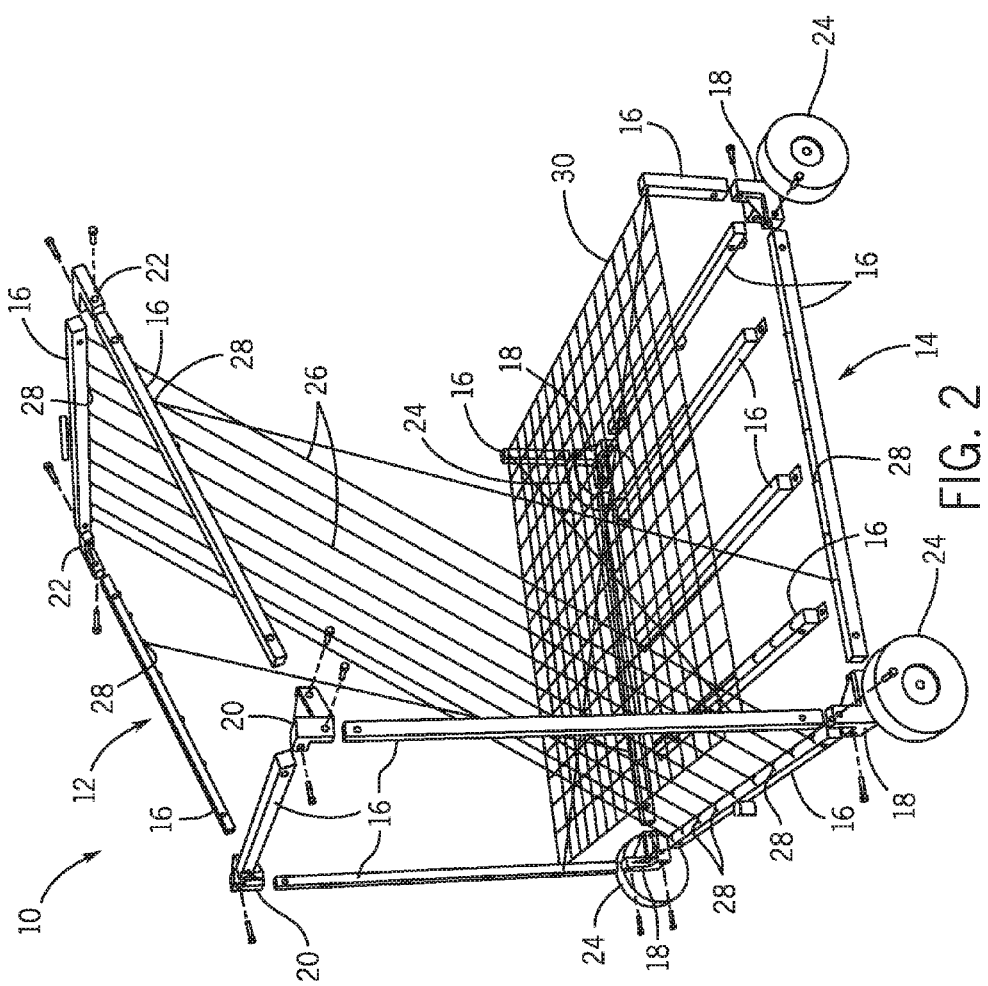
FIG. 2 is an exploded perspective view of the present invention.
Figure 3:
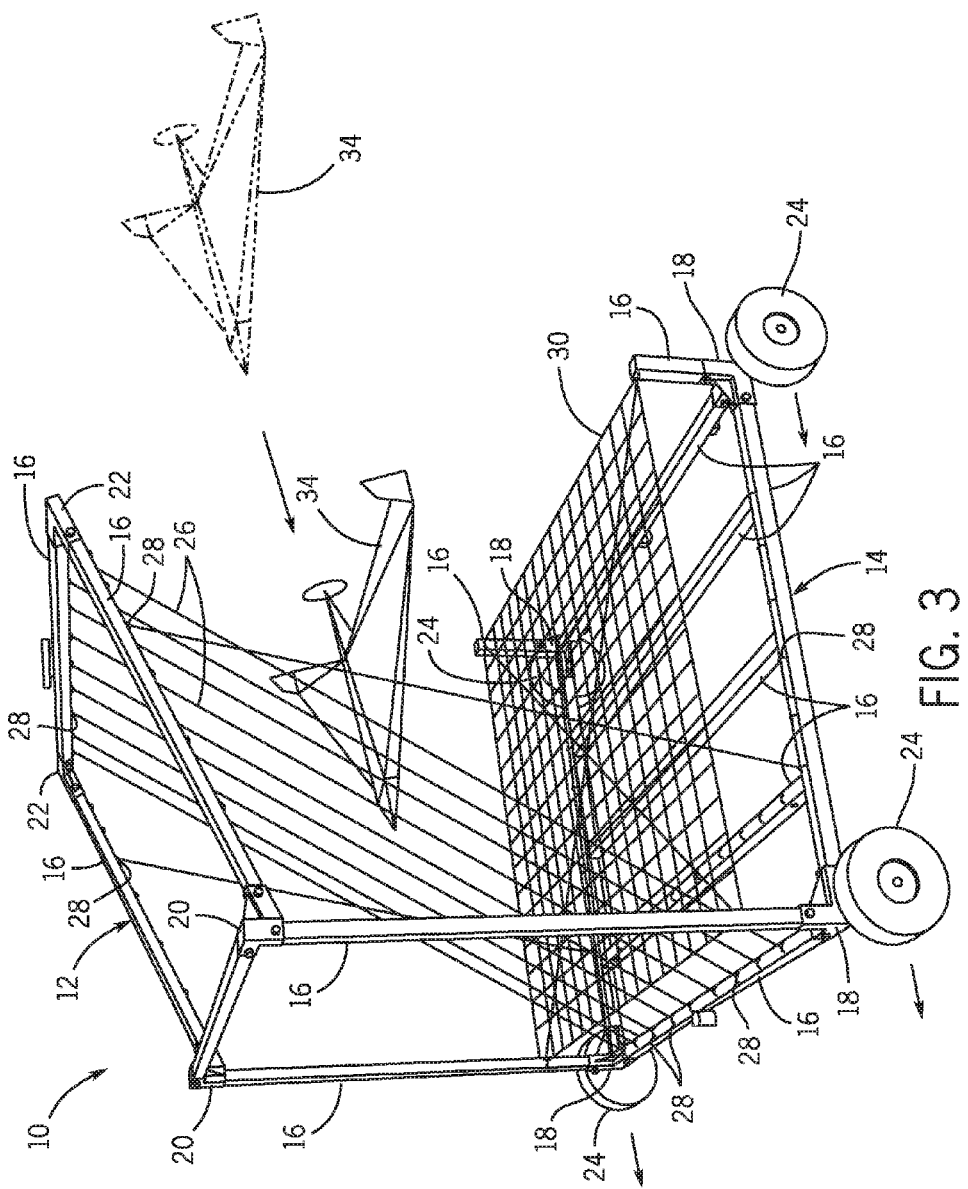
FIG. 3 is a rear perspective view showing the present invention in use.
Figure 4:
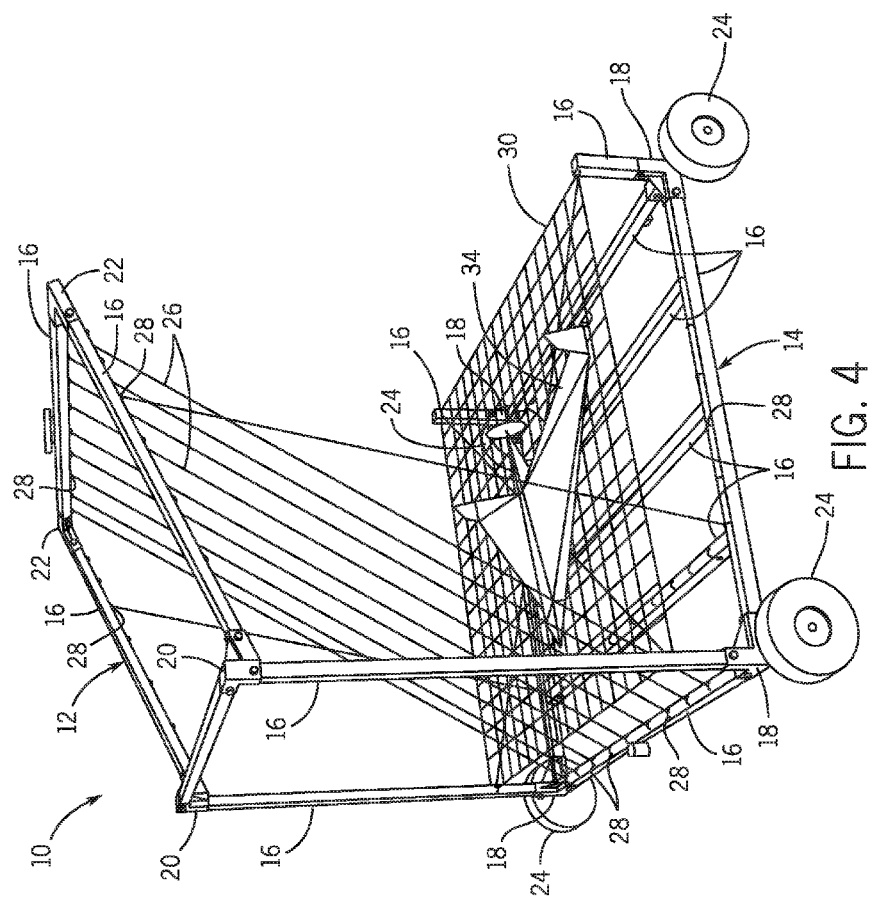
FIG. 4 is a rear perspective view showing the present invention in use.
Figure 5:
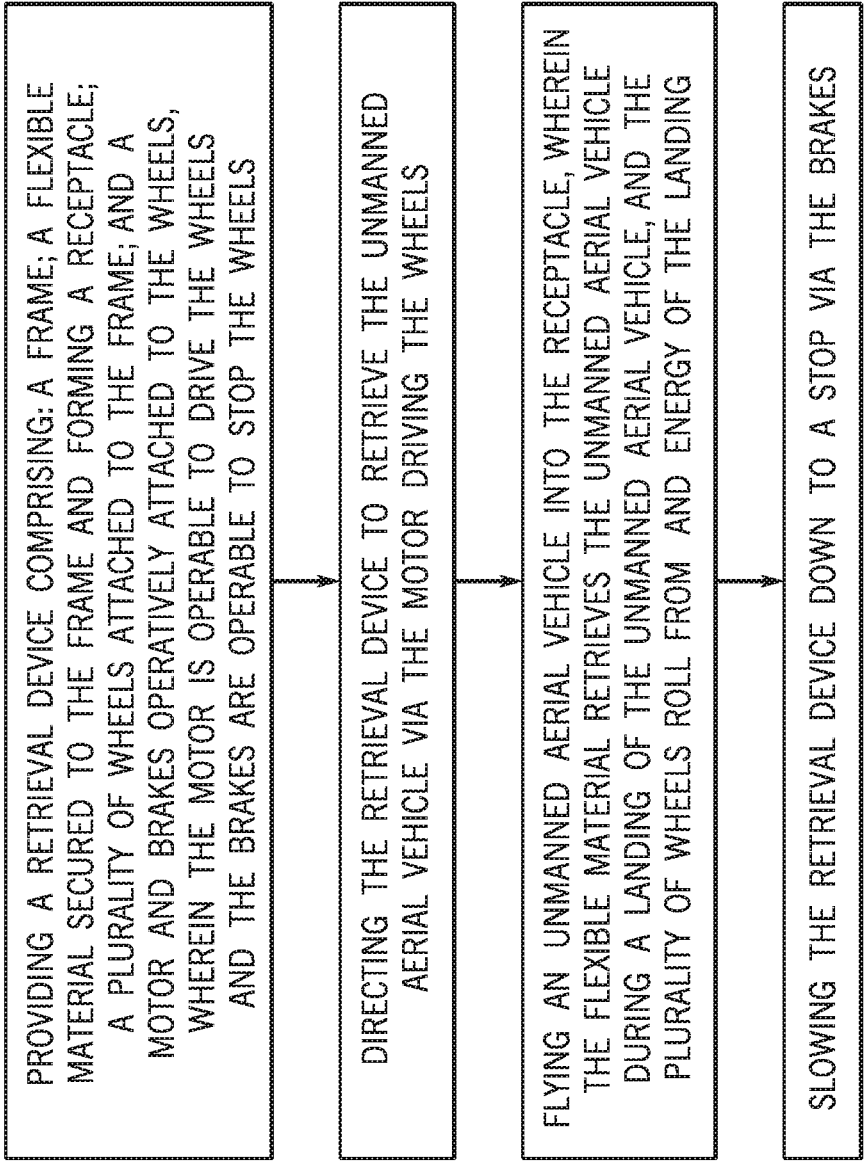
FIG. 5 is a flow chart of a method of using the present invention.

Referring to FIGS. 1 through 4, the present invention may include a retrieval device 10. The retrieval device 10 may include a frame having a base portion 14 and an upper portion 12. The frame may include a flexible material disposed on the base portion 14 and the upper portion 12. The flexible material may form a receptacle portion to receive at least a portion of an unmanned aerial vehicle 34 (UAV). The present invention may further include a plurality of wheels 24 attached to the base portion 14. Therefore, the UAV 34 may land within the receptacle portion, and the retrieval device 10 may absorb the energy exerted by the UAV 34 from the landing, as the retrieval device 10 may roll to an eventual stop.

In certain embodiments of the present invention, the frame may be made out of a plurality of frame members 16 joined together by brackets 18, 20, 22 and pins or bolts. In certain embodiments, the frame members 16 may be square or circular tube beams of desired length and material which may be adjusted to different sized UAVs 34. The base portion 14 may include outer frame members 16 joined together by corner brackets 18 to form the shape of a parallelogram, such as a square. A plurality of frame members 16 may run across the base portion 14 for additional support. In certain embodiments, the base portion 14 may include a front side and a rear side. In certain embodiments, shortened frame members 16 may protrude from the front side and may be connected to the base portion 14 by corner brackets 18.

In certain embodiments, the upper portion 12 of the frame may protrude from the rear side of the base portion 14. The upper portion 12 may be connected to the base portion 14 by corner brackets 18. The upper portion 12 may protrude upwards from the base portion 14 and in certain embodiments may include a first segment and a second segment. The first segment may be connected to the base portion 14 and the second segment 12 may protrude outwardly from the first segment towards the front side of the base portion 14. The first segment and the second segment may be connected together by corner brackets 20 and the second segment may be connected together by corner brackets 22.

As mentioned above, a flexible material may be disposed on the base portion 14 and the upper portion 14 of the frame. The flexible material may be any flexible material, such as foam, flexible cords, inflatable materials, compressible polymers, and the like, as long as the material may receive and capture a UAV 34 without undue stress. As illustrated in the figures, the flexible material may include netting 30 and bungee cords 26.

In certain embodiments, the netting 30 may be connected to the base portion 14 and may provide a resting area for the UAV 34. In certain embodiments, the netting 30 may be substantially parallel with the base or with a surface in which the retrieval device is resting. The netting 30 may be connected to the shortened frame members 16 near the front side of the base portion 14 extending all the way to the rear portion of the base 14 connecting to the first segment of the upper portion 12.

As illustrated in the Figures, bungee cords 26 may connect to the upper portion 12 of the frame and thereby cover at least a portion of the upper portion 12. In certain embodiments, a first end of the bungee cords 26 may attach to and extend from eyelets 28 on the base portion 14. A second end of the bungee cords 26 may extend and attach to eyelets 28 on the upper portion 12 of the frame. In certain embodiments, the second end of the bungee cords 28 may attach to the second segment of the upper portion 12. As illustrated in the Figures, the bungee cords 26 may be disposed at an angle relative to the netting 30 to guide the UAV 34 downward onto the net 30. The bungee cords 26 and the netting 30 form a receptacle portion in which a UAV 34 may be captured and may rest.

As mentioned above, the present invention may further include a plurality of wheels 24. The wheels 24 may be attached to the base portion 14 creating a retrieval device 10 that rolls. The wheels 24 may include tires and wheels so that the frame may be moved easily and may roll forward when capturing the UAV 34. As illustrated in the Figures, there may be four wheels 24, one at each corner of the base portion 14. However, there may be more or less wheels 24 attached in different configurations.

In certain embodiments, a motor, such as a gas or electric motor, may be operatively connected to the wheels 24. The motor may be connected to a chain or belt to operate the wheels 24. In certain embodiments, the wheels 24 may further include a braking system. A controller may further control the motor and the braking system. Therefore, the retrieval device may be moved and directed to receive the UAV 34, and may be controlled to slow down when appropriate.

In certain embodiments, the wheels 24 of the present invention may be used with a rail system. Therefore, the retrieval device 10 may be placed on the rail system which may create less friction than the tires on the ground, allowing the present invention to move forward with ease upon impact of the UAV 34.

It should be understood, of course, that the foregoing relates to exemplary embodiments of the invention and that modifications may be made without departing from the spirit and scope of the invention as set forth in the following claims.

What is claimed is:

1. A method of retrieving an unmanned aerial vehicle comprising:
   providing a retrieval device comprising:
      a frame;
      a flexible material secured to the frame and forming a receptacle; and
      a plurality of wheels attached to the frame;
   flying an unmanned aerial vehicle into the receptacle, wherein
   the flexible material retrieves the unmanned aerial vehicle during a landing of the unmanned aerial vehicle, and
   the plurality of wheels roll from an energy of the unmanned aerial vehicle impacting the flexible material during the landing.

2. The method of claim 1, wherein the frame comprises a base portion and an upper portion made of a plurality of frame members joined together by brackets.

3. The method of claim 2, wherein the base portion comprises a front side and a rear side, wherein a shortened frame member is protruding from the front side, and the upper portion is protruding from the rear side.

4. The method of claim 3, wherein the upper portion comprises a first segment and a second segment, wherein the first segment is connected to the rear side of the base portion and the second segment is protruding from the first segment towards the front side of the base portion.

5. The method of claim 4, wherein the flexible material comprises netting and a plurality of bungee cords.

6. The method of claim 5, wherein the netting is attached to the shortened frame member of the base portion and to the first segment of the upper portion.

7. The method of claim 5, wherein the bungee cords are attached to the rear side of the base portion and the second segment of the upper portion.

8. The method of claim 7, wherein the bungee cord and the netting form the receptacle portion, and wherein the bungee cords and the netting are at an acute angle relative to one another.

9. The method of claim 1, wherein the retrieval device further comprises a motor and brakes operatively attached to the wheels, wherein the motor is operable to drive the wheels and the brakes are operable to stop the wheels.

10. The method of claim 9, further comprising the step of:
   directing the retrieval device to retrieve the unmanned aerial vehicle via the motor driving the wheels; and
   slowing the retrieval device down to a stop via the brakes after the unmanned aerial vehicle is retrieved.

* * * * *